United States Patent
Swab

(10) Patent No.: US 11,287,163 B2
(45) Date of Patent: Mar. 29, 2022

(54) FUEL LEAK DETECTION IN A GASEOUS FUELED TRANSPORTATION REFRIGERATION UNIT

(71) Applicant: CARRIER CORPORATION, Palm Beach Gardens, FL (US)

(72) Inventor: Michael Thomas Swab, Acworth, GA (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 263 days.

(21) Appl. No.: 16/487,899

(22) PCT Filed: Feb. 22, 2018

(86) PCT No.: PCT/US2018/019130
§ 371 (c)(1),
(2) Date: Aug. 22, 2019

(87) PCT Pub. No.: WO2018/156699
PCT Pub. Date: Aug. 30, 2018

(65) Prior Publication Data
US 2020/0232685 A1    Jul. 23, 2020

Related U.S. Application Data

(60) Provisional application No. 62/462,466, filed on Feb. 23, 2017.

(51) Int. Cl.
*F25B 27/00*     (2006.01)
*B60H 1/32*      (2006.01)
(Continued)

(52) U.S. Cl.
CPC .......... *F25B 27/00* (2013.01); *B60H 1/3232* (2013.01); *B60P 3/20* (2013.01); *F02D 2041/225* (2013.01); *F25D 11/003* (2013.01); *F25D 19/003* (2013.01)

(58) Field of Classification Search
CPC ............... F02D 41/0025; F02D 41/22; F02D 2200/0614; F25D 11/003; B60P 3/20
See application file for complete search history.

(56) References Cited

U.S. PATENT DOCUMENTS 3,175,606 A * 3/1965 Talmey ................. B60P 3/20
                                                    165/41
5,284,120 A   2/1994 Fukushima et al.
(Continued)

FOREIGN PATENT DOCUMENTS

CN      105334010 A      2/2016
DE      19830619 A1 *    1/2000   ......... F02M 37/0047
(Continued)

OTHER PUBLICATIONS

H. Fathollahzadeh et al.; Design and Calibration of a Fuel Cosumption Measurement System for a Diesel Tractor; Agricultural Engineering International: The CIGR Journal; Manuscript No. 1408, vol. 13, Issue 2, Jun. 2011, 1-12 pages.
(Continued)

*Primary Examiner* — Ana M Vazquez
(74) *Attorney, Agent, or Firm* — Cantor Colburn LLP

(57) ABSTRACT

A transport refrigeration system includes a prime mover configured to power a refrigeration unit and a first fuel tank fluidly connected to prime mover through a first fuel line. The first fuel tank is configured to supply fuel to an inlet of prime mover from an outlet of first fuel tank through first fuel line. The transport refrigeration system also includes a first fuel flow sensor being an in-line flow meter and configured to measure a first fuel quantity exiting first fuel tank, a second fuel flow sensor being an in-line flow meter and configured to measure a second fuel quantity entering prime mover, a controller configured to compare second fuel quantity to first fuel quantity, and an alarm configured to
(Continued)

activate when second fuel quantity is not equal to first fuel quantity.

17 Claims, 4 Drawing Sheets

(51) Int. Cl.
*B60P 3/20* (2006.01)
*F02D 41/22* (2006.01)
*F25D 11/00* (2006.01)
*F25D 19/00* (2006.01)

(56) References Cited

U.S. PATENT DOCUMENTS

| | | | |
|---|---|---|---|
| 5,946,095 | A | 8/1999 | Henningsen et al. |
| 7,197,407 | B2 | 3/2007 | Schimnowski et al. |
| 7,739,004 | B2 | 6/2010 | Johnson |
| 8,382,469 | B2 | 2/2013 | Malm |
| 9,064,401 | B2 | 6/2015 | Grant et al. |
| 9,284,895 | B2 | 3/2016 | Naidu et al. |
| 2008/0103703 | A1 | 5/2008 | Tichborne et al. |
| 2013/0316293 | A1 | 11/2013 | Yokohata et al. |
| 2017/0292419 | A1* | 10/2017 | Conway ............... B62D 33/048 |

FOREIGN PATENT DOCUMENTS

| | | | |
|---|---|---|---|
| DE | 102004049737 A1 | 6/2006 | |
| DE | 102005032636 A1 | 1/2007 | |
| EP | 1496247 A1 | 1/2005 | |
| EP | 1544008 A2 | 6/2005 | |
| JP | 2001304663 A | 10/2001 | |
| JP | 2006250024 A | 9/2006 | |
| WO | 2014168562 A1 | 10/2014 | |
| WO | 2014168564 A1 | 10/2014 | |
| WO | WO-2014168564 A1 * | 10/2014 | ......... F02D 41/3082 |
| WO | 2015075545 A1 | 5/2015 | |

OTHER PUBLICATIONS

James Doorhy; Pipeline & Gas Journal: Real-Time Pipeline Leak Detection and Location Using Volume Balancing; Siemens Industry, Inc.; Feb. 2011; 2 pages.
Notification of Transmittal of the International Search Report for International Application No. PCT/US2018/019130; Report dated May 7, 2018; Report Received Date: May 9, 2018; 6 pages.
Written Opinion of the International Searching Authority for International Application No. PCT/US2018/019130; Report dated May 7, 2018; Report Received Date: May 9, 2018; 7 pages.

* cited by examiner

FUEL LEAK DETECTION IN A GASEOUS FUELED TRANSPORTATION REFRIGERATION UNIT

CROSS-REFERENCE TO RELATED APPLICATIONS

This application is a National Stage of International Application No. PCT/US2018/019130 filed Feb. 22, 2018, which claims priority to U.S. Provisional Patent Application Ser. No. 62/462,466 filed Feb. 23, 2017, both of which are incorporated herein by reference in their entirety.

BACKGROUND

The embodiments herein generally relate to fuel systems and more specifically, the fuel systems of transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transport refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven. Transport refrigeration systems may also be electrically driven. In an electrically driven transport refrigeration system, a prime mover carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator.

The prime mover typically is an engine carried on and considered part of the transport refrigeration unit, while the vehicle includes a separate engine to power the vehicle. Fuel is supplied to the prime mover from a fuel tank through a fuel line. Commonly, a fuel leak in the fuel line is detected using one or more combustible gas detectors located in the vicinity of the fuel line. A leak may or may not be detected by the combustible gas detector depending on the location of the combustible gas detector and/or the air flow around the gas line, which may lead leaked gas away from the gas detector. Leaking gas should be detected immediately and thus a more efficient system for monitoring the fuel system and detecting a leak is desired.

BRIEF DESCRIPTION

According to one embodiment, a transport refrigeration system is provided. The transport refrigeration system comprising: a prime mover configured to power a refrigeration unit; a first fuel tank fluidly connected to the prime mover through a first fuel line, the first fuel tank configured to supply fuel to an inlet of the prime mover from an outlet of the first fuel tank through the first fuel line; a first fuel flow sensor being an in-line flow meter and configured to measure a first fuel quantity exiting the first fuel tank; a second fuel flow sensor being an in-line flow meter and configured to measure a second fuel quantity entering the prime mover; a controller in operative communication with the first fuel flow sensor and the second fuel flow sensor, the controller being configured to compare the second fuel quantity to the first fuel quantity; and an alarm configured to activate when the second fuel quantity is not equal to the first fuel quantity.

In addition to one or more of the features described above, or as an alternative, further embodiments of the transport refrigeration system may include a fuel shut off valve located within the first fuel line, the fuel shut off valve being configured to close when the second fuel quantity is not equal to the first fuel quantity.

In addition to one or more of the features described above, or as an alternative, further embodiments of the transport refrigeration system may include where the first fuel quantity is measured at a first time and the second fuel quantity is measured at a second time, wherein the first time and the second time are separated by a first selected time period in response to the fuel flow rate change.

In addition to one or more of the features described above, or as an alternative, further embodiments of the transport refrigeration system may include where the fuel is at least one of propane, compressed natural gas, and liquid natural gas.

In addition to one or more of the features described above, or as an alternative, further embodiments of the transport refrigeration system may include where the alarm is activated when the second fuel quantity is not equal to the first fuel quantity within a selected tolerance.

In addition to one or more of the features described above, or as an alternative, further embodiments of the transport refrigeration system may include where the alarm is activated when the second fuel quantity is not equal to the first fuel quantity over a second selected time period.

In addition to one or more of the features described above, or as an alternative, further embodiments of the transport refrigeration system may include where the first fuel flow sensor is located at the outlet of the first fuel tank.

In addition to one or more of the features described above, or as an alternative, further embodiments of the transport refrigeration system may include where the second fuel flow sensor is located at the inlet of the prime mover.

According to another embodiment, a method of detecting a fuel leak in a transport refrigeration system is provided. The method comprising: powering a refrigeration unit using a prime mover; supplying fuel to the prime mover from a first fuel tank, wherein an outlet of the first fuel tank is fluidly connected to an inlet of the prime mover through a first fuel line; measuring, using a first fuel flow sensor, a first fuel quantity exiting the first fuel tank, the first fuel flow sensor being an in-line flow meter; measuring, using a second fuel flow sensor, a second fuel quantity entering the prime mover, the second fuel flow sensor being an in-line flow meter; comparing the second fuel quantity to the first fuel quantity; and activating an alarm when the second fuel quantity is not equal to the first fuel quantity.

In addition to one or more of the features described above, or as an alternative, further embodiments of the method may include: closing a fuel shut off valve when the second fuel quantity is not equal to the first fuel quantity.

In addition to one or more of the features described above, or as an alternative, further embodiments of the method may include where the first fuel quantity is measured at a first time and the second fuel quantity is measured at a second time, wherein the first time and the second time are separated by a first selected time period in response to the fuel flow rate change.

In addition to one or more of the features described above, or as an alternative, further embodiments of the method may include where the fuel is at least one of propane, compressed natural gas, and liquid natural gas.

In addition to one or more of the features described above, or as an alternative, further embodiments of the method may include where the alarm is activated when the second fuel quantity is not equal to the first fuel quantity within a selected tolerance.

In addition to one or more of the features described above, or as an alternative, further embodiments of the method may include where the alarm is activated when the second fuel quantity is not equal to the first fuel quantity over a second selected time period.

According to another embodiment, a fuel leak detection system is provided. The fuel leak detection system comprising: a prime mover; a first fuel tank fluidly connected to the prime mover through a first fuel line, the first fuel tank configured to supply fuel to an inlet of the prime mover from an outlet of the first fuel tank through the first fuel line; a first fuel flow sensor being an in-line flow meter and configured to measure a first fuel quantity exiting the first fuel tank; a second fuel flow sensor being an in-line flow meter and configured to measure a second fuel quantity entering the prime mover; a controller in operative communication with the first fuel flow sensor and the second fuel flow sensor, the controller being configured to compare the second fuel quantity to the first fuel quantity; and an alarm configured to activate when the second fuel quantity is not equal to the first fuel quantity.

In addition to one or more of the features described above, or as an alternative, further embodiments of the fuel leak detection system may include: a fuel shut off valve located within the first fuel line, the fuel shut off valve being configured to close when the second fuel quantity is not equal to the first fuel quantity.

In addition to one or more of the features described above, or as an alternative, further embodiments of the fuel leak detection system may include where the first fuel quantity is measured at a first time and the second fuel quantity is measured at a second time, wherein the first time and the second time are separated by a first selected time period in response to the fuel flow rate change.

In addition to one or more of the features described above, or as an alternative, further embodiments of the fuel leak detection system may include where the fuel is at least one of propane, compressed natural gas, and liquid natural gas.

In addition to one or more of the features described above, or as an alternative, further embodiments of the fuel leak detection system may include where the alarm is activated when the second fuel quantity is not equal to the first fuel quantity within a selected tolerance.

In addition to one or more of the features described above, or as an alternative, further embodiments of the fuel leak detection system may include where the alarm is activated when the second fuel quantity is not equal to the first fuel quantity over a second selected time period.

Technical effects of embodiments of the present disclosure include a first fuel monitor at an outlet of a fuel tank, a second fuel monitor at the inlet of a prime mover, and a controller to detect a difference in fuel flow between the first fuel monitor and the second fuel monitor, thus signifying a leak.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
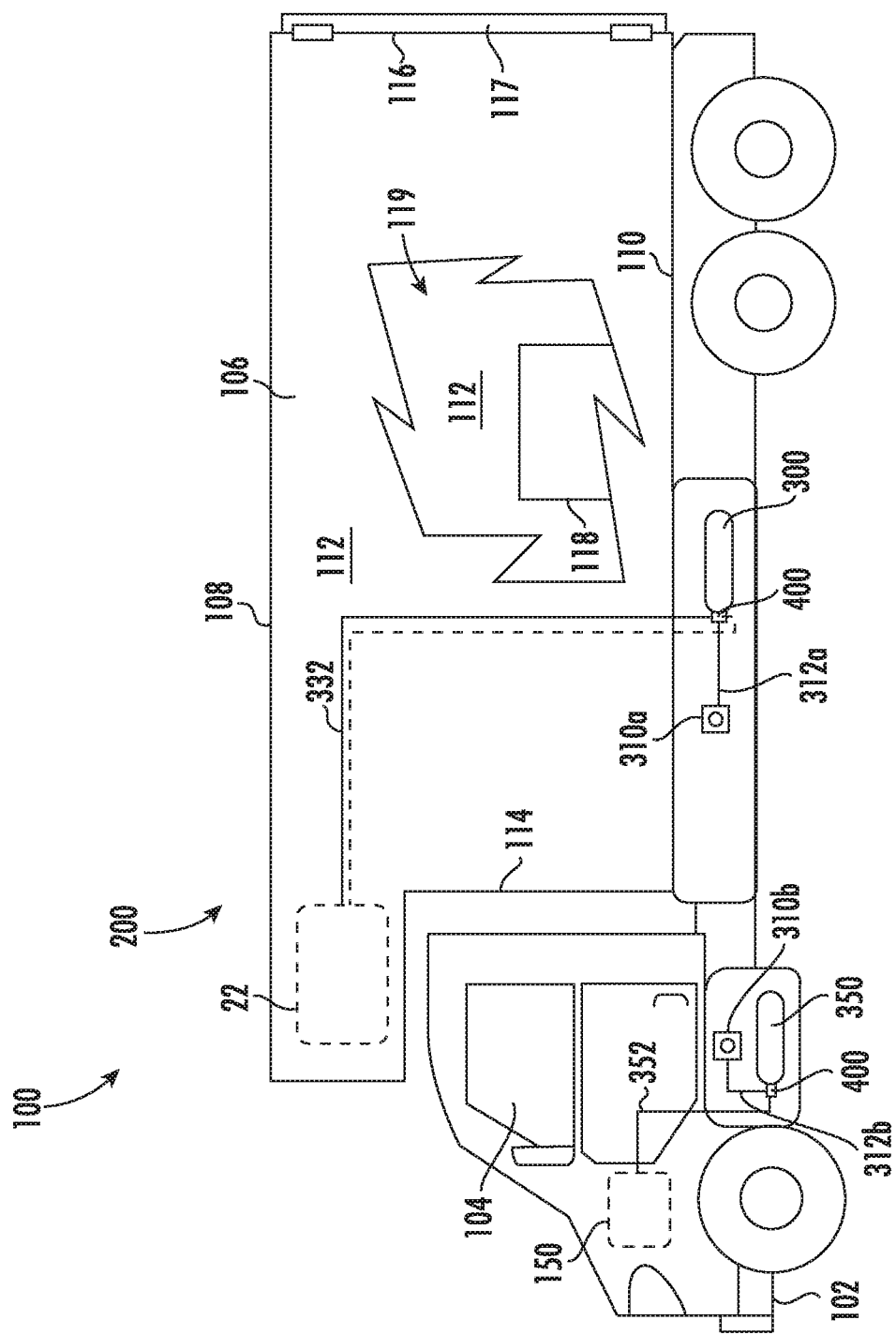
FIG. 1 is a schematic illustration of a transport refrigeration system, according to an embodiment of the present disclosure.
Figure 2:
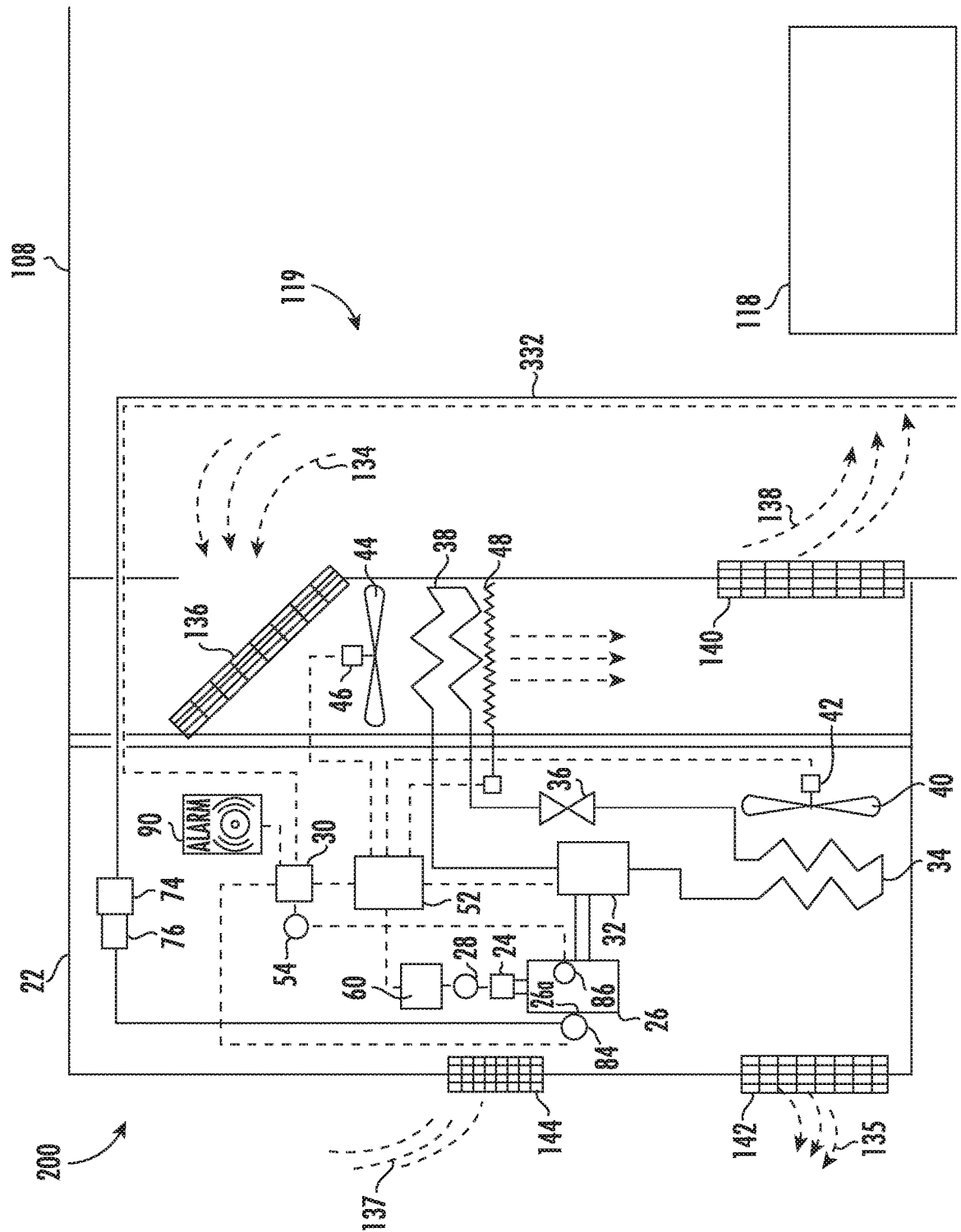
FIG. 2 is an enlarged schematic illustration of the transport refrigeration system of FIG. 1, according to an embodiment of the present disclosure.

Referring to FIGS. 1-2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is being illustrated as a trailer system 100, as seen in FIG. 1. The trailer system 100 includes a vehicle 102 and a transport container 106. The vehicle 102 includes an operator's compartment or cab 104 and an engine 150 which acts as the drive system of the trailer system 100. The fuel that powers the engine 150 may be at least one of diesel, gasoline, propane, compressed natural gas, and liquefied natural gas. In the illustrated embodiment, the fuel to power the engine 150 of the vehicle 102 is stored in a second fuel tank 350. The second fuel tank 350 is fluidly connected to the engine 150 through a second fuel line 352. The second fuel tank 350 is configured to supply fuel to the engine 150 through the second fuel line 352. The transport container 106 is coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to non-trailer refrigeration such as, for example a rigid truck or a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a refrigeration unit 22, a refrigerant compression device 32, a prime mover 26 for driving the refrigerant compression device 32, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119, as known to one of ordinary skill in the art. In an embodiment, the refrigeration unit 22 is capable of providing a desired temperature and humidity range.

As seen in FIG. 2, the refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerate cargo space 119 of the transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

The refrigerant compression device 32 may comprise a single-stage or multiple-stage compressor such as, for example, a reciprocating compressor or a scroll compressor. The refrigerant compression device 32 may be directly driven by the prime mover 26 connected to the refrigerant by mechanical connection, such as, for example a drive shaft or belt. Alternatively, the prime mover 26 may drive a power generation device, which may provide power to an electric motor to drive the refrigerant compression device 32. The fuel that powers the prime mover 26 may be at least one of propane, compressed natural gas, and liquefied natural gas. In the illustrated embodiment, the fuel to power the prime mover 26 is stored in a first fuel tank 330. The first fuel tank 330 is fluidly connected to the prime mover 26 through a first fuel line 332. The first fuel tank 330 is configured to supply fuel to the prime mover 26 through the first fuel line 332.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the prime mover 26, typically through an electronic engine controller 54 operatively associated with the prime mover 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

In the depicted embodiment, the prime mover 26 drives a power generation device 24 to provide electrical power to the refrigeration unit 22. The drive shaft of the engine drives the electric generation device 24. The electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

The electrical power generated by the power generation device 24 may be stored in a battery 60. The refrigeration unit 22 has a plurality of power demand loads, including, but not limited to, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

Figure 3:
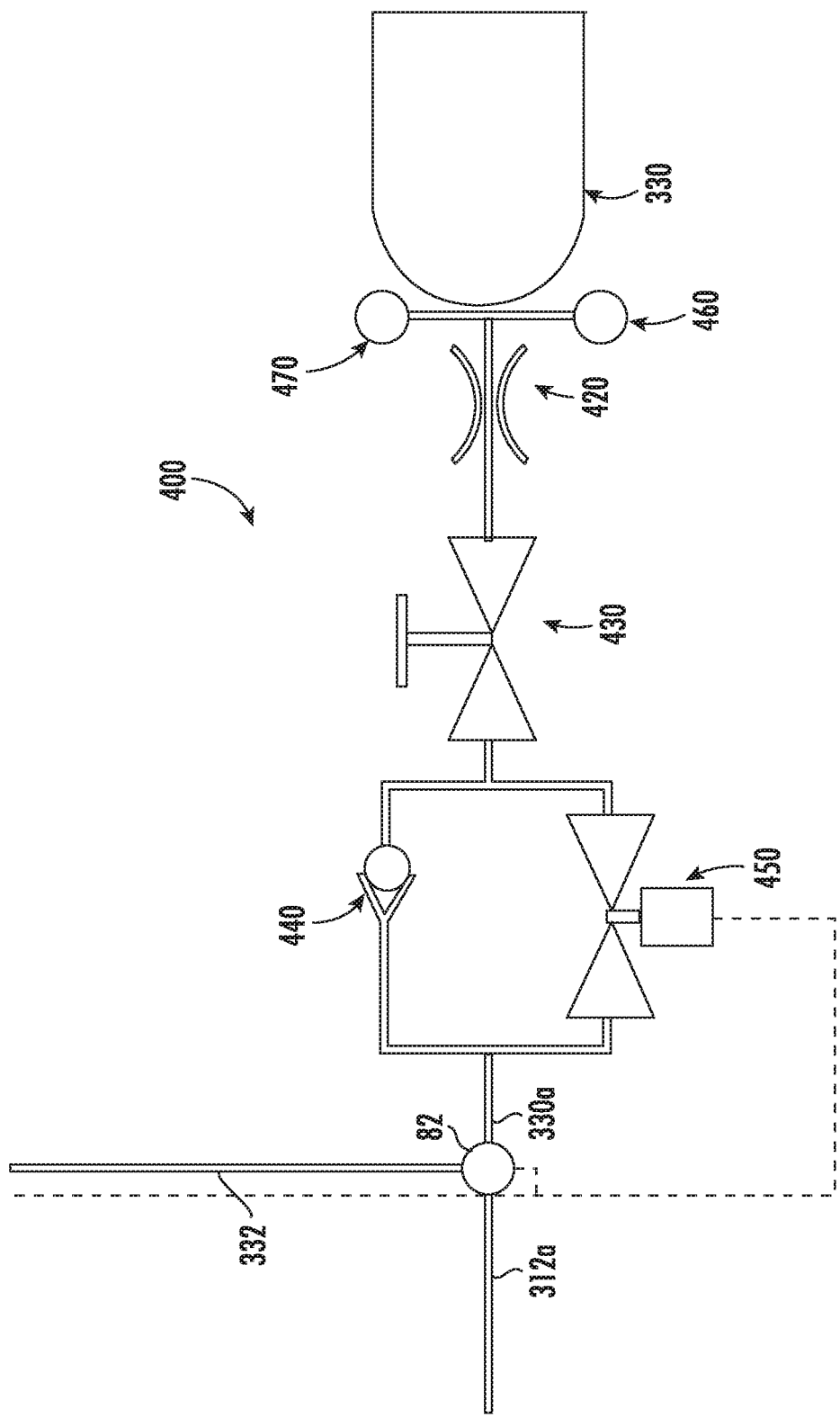
FIG. 3 is a schematic illustration of a tank connection device connected to a first fuel tank, according to an embodiment of the present disclosure.

The first fuel tank 330 includes a tank connection device 400, as seen in FIG. 1. The second fuel tank 350 may also include a similar tank connection device 400 depending on the type of fuel required by the engine 150. There may be multiple first fuel tanks 330 and multiple second fuel tanks 350 depending on the fuel requirements of the prime mover 26 and the engine 150. The tank connection device 400 fluidly connects each tank 330, 350 to its respective filling point 310a, 310b through a filling line 312a, 312b, as shown in FIG. 1. As shown in FIG. 3, the tank connection device 400 comprises: a pressure regulator 420 fluidly connected to one of the fuel tanks 330, 350; a thermal fuse 470; a bursting disk 460; a manual valve 430 fluidly connected to the pressure regulator 420; a check valve 440 fluidly connected to the manual valve 430 and the refilling point 310a; and a fuel shut off valve 450 fluidly connected to the manual valve 430 and the refilling point 310a. As illustrated in FIG. 3, the fuel shut off valve 450 may be fluidly connected in parallel to the check valve 440. The fuel shut off valve 450 may be a solenoid valve. The fuel shut off valve 450 is in operative communication with the controller 30 and the controller 30 controls the operation of the fuel shut off valve 450. The check valve 440 and the fuel shut off valve 450 are connected to the refilling point 310a through the filling line 312a. Also, in regard to the first fuel tank 330, the check valve 440 and the fuel shut off valve 450 are connected to the prime mover 26 through the first fuel line 332, as seen in FIG. 3. Advantageously, the tank connection device 400 helps prevent the fuel tanks from being over filled and also allows the fuel to be consumed as commanded.

As seen in FIG. 2, the first fuel line 332 may have a regulator 74 and a pressure relief valve 76. The regulator 74 reduces the pressure of the fuel coming from the first fuel tank 330 to the prime mover 26. The regulator 74 may be needed when utilizing a fuel that is stored at a high pressure in the first tank 330 but must be consumed at a lower pressure by the prime mover 26, such as, for example compressed natural gas. The pressure relief valve 76 may relieve pressure in the first fuel line 332 in the event pressure exceeds a selected value.

The first fuel line 332 also comprises: a first fuel flow sensor 82 in the first fuel line 332 and located at an outlet 330a of the first fuel tank 330. The first fuel flow sensor 82 is configured to measure a first fuel quantity flowing out of the first fuel tank 330. In an embodiment, the first fuel flow sensor 82 is an in-line flow meter. The first fuel line further comprises a second fuel flow sensor 84 in the first fuel line 332 and located at an inlet 26a of the prime mover 26. The second fuel flow sensor 84 is configured to measure a second fuel quantity flowing into the prime mover 26. In an embodiment, the second fuel flow sensor 84 is an in-line flow meter. In an embodiment, the second fuel flow sensor 84 is a part of the prime mover 26 and may come standard with the prime mover 26. The second fuel flow sensor 84 may also be a fuel regulator in operative communication with the engine controller 54. The engine controller 54 will measure the load the prime mover 26 is under, the desired RPM, the oxygen content of the exhaust gas and then adjust the spark timing and the amount of fuel it meters into the engine 26. By default, the engine controller 54 has the information of fuel flow rate, the amount of fuel consumed and fuel pressure at the engine. Further, the engine controller 54 knows how much fuel it needs to allow into the prime mover 26 in the immediate future so we have the ability of predicted flow and quantity. Advantageously, by making use of a second fuel flow sensor 84 already existent in the prime mover 26, only a first fuel flow meter needs to be added at the fuel tank 330.

The first fuel flow sensor 82 and the second fuel flow sensor 84 are in operative communication with the controller 30 and the controller 30 controls the operation of the fuel flow sensors 82, 84. The first fuel flow sensor 82 transmits the first fuel quantity to the controller 30. The second fuel flow sensor 84 transmits the second fuel quantity to the controller 30. The controller 30 is configured to compare the first fuel quantity to the second fuel quantity. If the first fuel quantity does not match the second fuel quantity it may be indicative that some fuel was lost in the first fuel line 332 between the first fuel flow sensor 82 and the second fuel flow sensor 84. The controller 30 is configured to activate an alarm 90 when the second fuel quantity is not equal to the first fuel quantity. The alarm 90 may be visual and/or audible. The alarm 90 may be located on the refrigeration unit 22, within the cab 104, or on an electronic device such as, for example, a cellular phone, a smart watch, a computer, a laptop, a pager or a similar device known to one of skill in the art. There may be a selected tolerance built into the comparison between the second fuel quantity and the first fuel quantity to prevent false alarms. In an embodiment, the alarm 90 may be activated when the second fuel quantity is not equal to the first fuel quantity within a selected tolerance. In another embodiment, the alarm is activated when the second fuel quantity is not equal to the first fuel quantity over a second selected time period. For instance, the alarm 90 may only activate if the second fuel quantity has not equaled the first fuel quantity in over a minute. The first fuel quantity measurement may be taken at a first time and the second fuel quantity measurement may be taken at a second time. The second fuel quantity measurement may be taken simultaneously with the first fuel quantity measurement or the second fuel quantity measurement may be taken at a first selected time period after the first fuel quantity measurement in response to changes in the fuel flow rate. The controller 30 may be configured to close the shutoff valve 450 when the second fuel quantity is not equal to the first fuel quantity. There may be a selected tolerance built in to the comparison between the second fuel quantity and the first fuel quantity to prevent false alarms. In an embodiment, the shutoff valve 450 is closed when the second fuel quantity is not equal to the first fuel quantity within a selected tolerance. In another embodiment, the shutoff valve 450 is closed when the second fuel quantity is not equal to the first fuel quantity over a second selected time period. For instance, the shutoff valve 450 may only close if the second fuel quantity has not equaled the first fuel quantity in over a minute.

Figure 4:
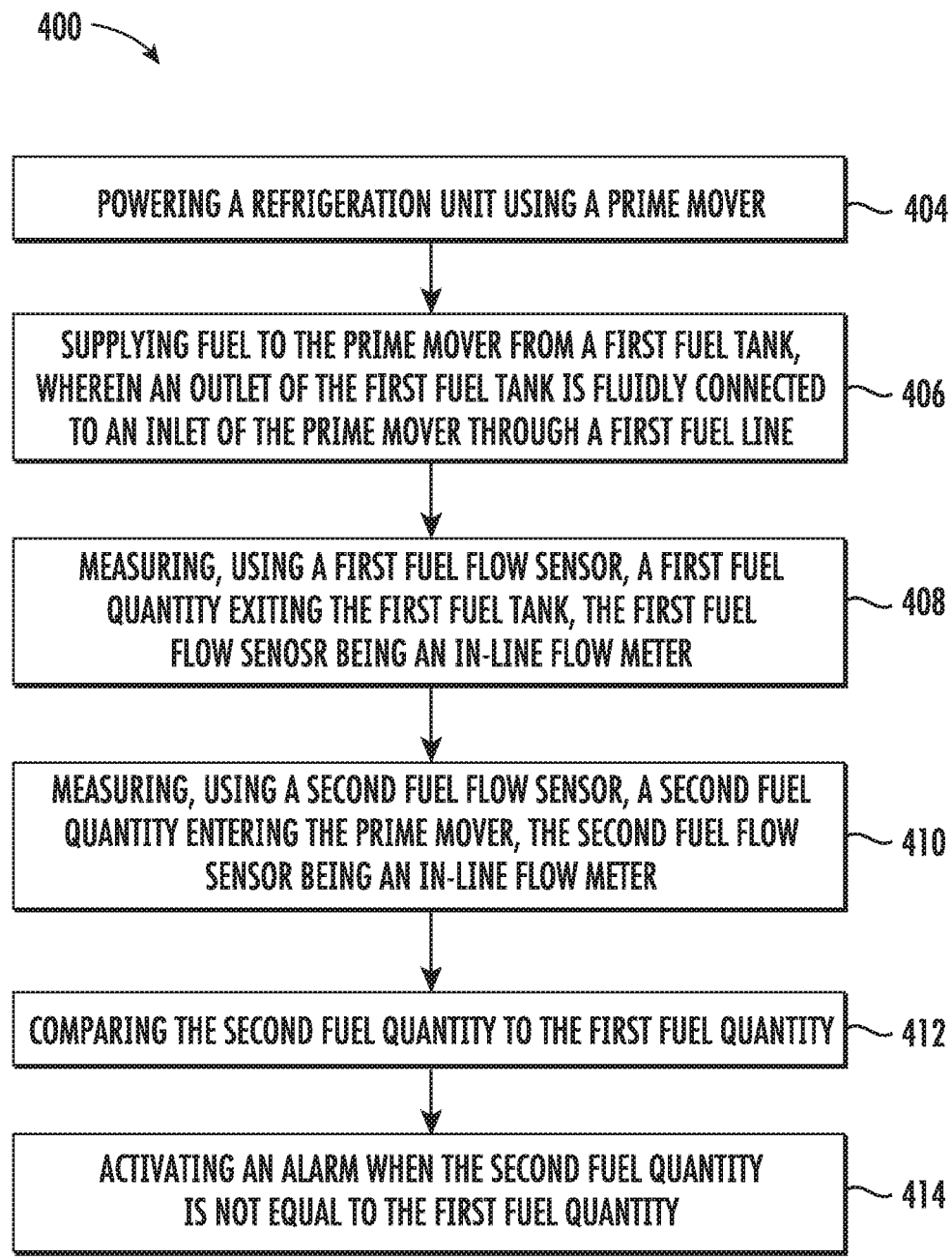
FIG. 4 is a flow diagram illustrating a method of detecting a leak within the fuel line of a transport refrigeration system, according to an embodiment of the present disclosure.

Referring now to FIG. 4 with continued reference to FIGS. 1-3. FIG. 4 shows a flow process illustrating a method 400 of detecting a leak within the fuel line of a transport refrigeration system 200, according to an embodiment of the present disclosure. At block 404, a refrigeration unit 22 is powered using a prime mover 26. At block 406, fuel is supplied to the prime mover 26 from a first fuel tank 330. As mentioned above, an outlet 330a of the first fuel tank 330 is fluidly connected to an inlet 26a of the prime mover 26 through a first fuel line 332. At block 408, a first fuel flow sensor 82 measures a first fuel quantity exiting the first fuel tank 330. As mentioned above, the first fuel flow sensor 82 is an in-line flow meter and located at the outlet 330a of the first fuel tank 330. At block 410, a second fuel flow sensor 84 measures a second fuel quantity entering the prime mover 26. As mentioned above, the second fuel flow sensor 84 is an in-line flow meter and located at the inlet 26a of the prime mover 26. At block 412, the second fuel quantity is compared to the first fuel quantity. At block 414, an alarm 90 is activated when the second fuel quantity is not equal to the first fuel quantity. In an embodiment, the alarm may be activated when the second fuel quantity is not equal to the first fuel quantity within a selected tolerance. In another embodiment, the alarm 90 may be activated when the second fuel quantity is not equal to the first fuel quantity over a second selected time period. For instance, the alarm 90 may only activate if the second fuel quantity has not equaled the first fuel quantity in over a minute.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a prime mover configured to power a refrigeration unit;
a first fuel tank fluidly connected to the prime mover through a first fuel line, the first fuel tank configured to supply fuel to an inlet of the prime mover from an outlet of the first fuel tank through the first fuel line;
a first fuel flow sensor being an in-line flow meter and configured to measure a first fuel quantity exiting the first fuel tank;
a second fuel flow sensor being an in-line flow meter and configured to measure a second fuel quantity entering the prime mover;
a controller in operative communication with the first fuel flow sensor and the second fuel flow sensor, the controller being configured to compare the second fuel quantity to the first fuel quantity; and
an alarm configured to activate when the second fuel quantity is not equal to the first fuel quantity, wherein the first fuel quantity is measured at a first time and the second fuel quantity is measured at a second time, wherein the first and the second time are separated by a first selected time period in response to a fuel flow rate change.

2. The transport refrigeration system of claim 1, further comprising:
a fuel shut off valve located within the first fuel line, the fuel shut off valve being configured to close when the second fuel quantity is not equal to the first fuel quantity.

3. The transport refrigeration system of claim 1, wherein the fuel is at least one of propane, compressed natural gas, and liquid natural gas.

4. The transport refrigeration system of claim 1, wherein the alarm is activated when the second fuel quantity is not equal to the first fuel quantity within a selected tolerance.

5. The transport refrigeration system of claim 1, wherein the alarm is activated when the second fuel quantity is not equal to the first fuel quantity over a second selected time period.

6. The transport refrigeration system of claim 1, wherein the first fuel flow sensor is located at the outlet of the first fuel tank.

7. The transport refrigeration system of claim 1, wherein the second fuel flow sensor is located at the inlet of the prime mover.

8. A method of detecting a fuel leak in a transport refrigeration system, the method comprising:
powering a refrigeration unit using a prime mover;
supplying fuel to the prime mover from a first fuel tank, wherein an outlet of the first fuel tank is fluidly connected to an inlet of the prime mover through a first fuel line;
measuring, using a first fuel flow sensor, a first fuel quantity exiting the first fuel tank, the first fuel flow sensor being an in-line flow meter;
measuring, using a second fuel flow sensor, a second fuel quantity entering the prime mover, the second fuel flow sensor being an in-line flow meter;
comparing the second fuel quantity to the first fuel quantity; and
activating an alarm when the second fuel quantity is not equal to the first fuel quantity,
wherein the first fuel quantity is measured at a first time and the second fuel quantity is measured at a second time, wherein the first and the second time are separated by a first selected time period in response to a fuel flow rate change.

9. The method of claim 8, further comprising:
closing a fuel shut off valve when the second fuel quantity is not equal to the first fuel quantity.

10. The method of claim 8, wherein the fuel is at least one of propane, compressed natural gas, and liquid natural gas.

11. The method of claim 8, wherein the alarm is activated when the second fuel quantity is not equal to the first fuel quantity within a selected tolerance.

12. The method of claim 8, wherein the alarm is activated when the second fuel quantity is not equal to the first fuel quantity over a second selected time period.

13. A fuel leak detection system comprising:
a prime mover;
a first fuel tank fluidly connected to the prime mover through a first fuel line, the first fuel tank configured to supply fuel to an inlet of the prime mover from an outlet of the first fuel tank through the first fuel line;
a first fuel flow sensor being an in-line flow meter and configured to measure a first fuel quantity exiting the first fuel tank;
a second fuel flow sensor being an in-line flow meter and configured to measure a second fuel quantity entering the prime mover;
a controller in operative communication with the first fuel flow sensor and the second fuel flow sensor, the controller being configured to compare the second fuel quantity to the first fuel quantity; and
an alarm configured to activate when the second fuel quantity is not equal to the first fuel quantity,
wherein the first fuel quantity is measured at a first time and the second fuel quantity is measured at a second time, wherein the first and the second time are separated by a first selected time period in response to a fuel flow rate change.

14. The fuel leak detection system of claim 13, further comprising:
a fuel shut off valve located within the first fuel line, the fuel shut off valve being configured to close when the second fuel quantity is not equal to the first fuel quantity.

15. The fuel leak detection system of claim 13, wherein the fuel is at least one of propane, compressed natural gas, and liquid natural gas.

16. The fuel leak detection system of claim 13, wherein the alarm is activated when the second fuel quantity is not equal to the first fuel quantity within a selected tolerance.

17. The fuel leak detection system of claim 13, wherein the alarm is activated when the second fuel quantity is not equal to the first fuel quantity over a second selected time period.

* * * * *